United States Patent
Nomura et al.

(10) Patent No.: US 11,484,029 B2
(45) Date of Patent: Nov. 1, 2022

(54) METHOD FOR CONTROLLING BUILDING-INHABITING PEST AND COMPOSITION FOR CONTROLLING BUILDING-INHABITING PEST

(71) Applicant: MITSUI CHEMICALS AGRO, INC., Tokyo (JP)

(72) Inventors: Michikazu Nomura, Mobara (JP); Ayumi Kawase, Yasu (JP); Ryuta Miyaji, Ako (JP); Ayaka Miki, Tatsuno (JP); Shinya Yoshida, Himeji (JP)

(73) Assignee: MITSUI CHEMICALS AGRO, INC., Tokyo (JP)

( * ) Notice: Subject to any disclaimer, the term of this patent is extended or adjusted under 35 U.S.C. 154(b) by 0 days.

(21) Appl. No.: 16/494,133

(22) PCT Filed: Mar. 28, 2018

(86) PCT No.: PCT/JP2018/012888
§ 371 (c)(1),
(2) Date: Sep. 13, 2019

(87) PCT Pub. No.: WO2018/181533
PCT Pub. Date: Oct. 4, 2018

(65) Prior Publication Data
US 2020/0015480 A1    Jan. 16, 2020

(30) Foreign Application Priority Data

Mar. 31, 2017 (JP) .............................. JP2017-072196

(51) Int. Cl.
*A01N 37/22* (2006.01)
*A01M 1/20* (2006.01)
(Continued)

(52) U.S. Cl.
CPC ............... *A01N 37/22* (2013.01); *A01M 1/20* (2013.01); *A01M 7/00* (2013.01); *A01M 13/00* (2013.01); *A01N 25/06* (2013.01); *A01N 25/18* (2013.01)

(58) Field of Classification Search
None
See application file for complete search history.

(56) References Cited

U.S. PATENT DOCUMENTS 9,237,745 B2 *   1/2016   Kobayashi ........... A61K 31/167
2011/0201687 A1  8/2011   Kobayashi

FOREIGN PATENT DOCUMENTS

JP   2002020202 A   1/2002
JP   2002186400 A   7/2002
(Continued)

OTHER PUBLICATIONS

International Search Report dated Jun. 19, 2018 filed in PCT/JP2018/012888.

*Primary Examiner* — Kyung S Chang
(74) *Attorney, Agent, or Firm* — Rankin, Hill & Clark LLP

(57) ABSTRACT

A composition for controlling a building-inhabiting pest, the composition including, as an active component, at least one kind of an amide derivative represented by the following Formula (1) in which, Q represents an unsubstituted phenyl group or a phenyl group substituted at the 2-, 3- or 4-position with one fluorine atom, R represents a hydrogen atom or a methyl group, and each of $Y_1$ and $Y_2$ independently represents a bromine atom, an iodine atom, or a trifluoromethyl group, and a method for controlling a building-inhabiting pest, the method including treating a space in a building with the composition.

(1)

(Continued)

13 Claims, 1 Drawing Sheet

(51) Int. Cl.
*A01M 7/00* (2006.01)
*A01M 13/00* (2006.01)
*A01N 25/06* (2006.01)
*A01N 25/18* (2006.01)

(56) References Cited

FOREIGN PATENT DOCUMENTS

| | | | |
|---|---|---|---|
| JP | 2002338404 | A | 11/2002 |
| JP | 2010035522 | A | 2/2010 |
| JP | 2011157296 | A | 8/2011 |
| JP | 2014101349 | A | 6/2014 |
| JP | 2014181188 | A | 9/2014 |
| WO | 2007013150 | A1 | 2/2007 |
| WO | 2010018714 | A1 | 2/2010 |
| WO | 2016166252 | A1 | 10/2016 |

* cited by examiner

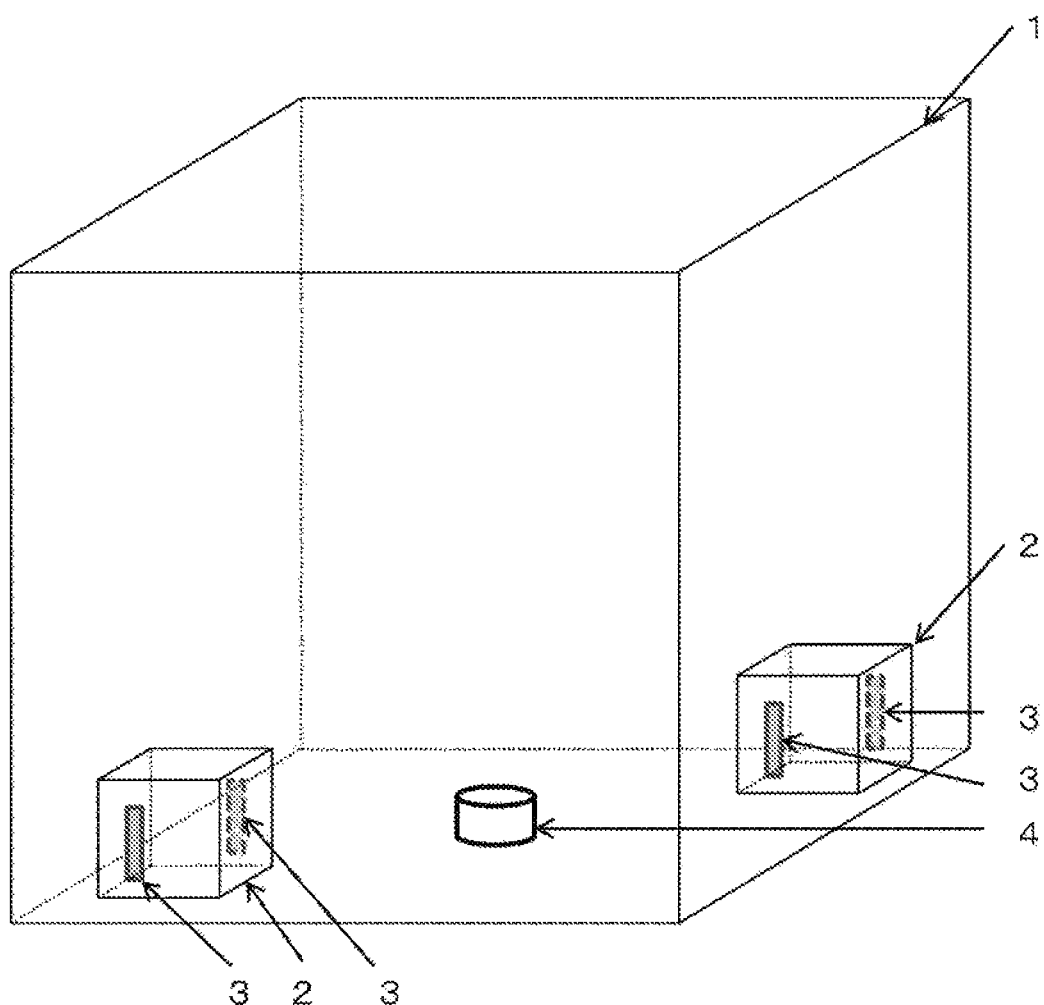

METHOD FOR CONTROLLING BUILDING-INHABITING PEST AND COMPOSITION FOR CONTROLLING BUILDING-INHABITING PEST

TECHNICAL FIELD

The present invention relates to a composition for controlling a building-inhabiting pest, and a method for controlling a building-inhabiting pest, which are for controlling pests inhabiting a building.

BACKGROUND ART

Conventionally, as a method for controlling pests inhabiting a building, a method of directly spraying pests with a composition containing a pest control component, a method of fumigating or smoke-treating the inside of a building with a composition containing a pest control component, or the like has been used. As pest control components, a pyrethroid compounds, carbamate compounds, and the like are known. Pyrethroid compounds are known to be excellent in terms of an immediate effect against pests due to a knockdown action, and to have a repellent effect. Further, pyrethroid compounds decompose quickly, and are excellent in terms of safety for human beings and animals.

However, pests that have acquired resistance to pyrethroid compounds have appeared, which has become a problem.

In addition, various compounds as an amide derivative having a pest control action, and the methods for using them have been disclosed (see, for example, Patent Documents 1 to 3). In Patent Documents 1 to 3, it has been described that an amide derivative having a specific chemical structure can control building-inhabiting pests; however, details of the effective amount and a method for using the amide derivative have not been disclosed, and a method for controlling a building-inhabiting pest by using the amide derivative has not been substantially disclosed.

CITATION LIST

Patent Literature

Patent Document 1: WO 2010/018714
Patent Document 2: WO 2007/013150
Patent Document 3: WO 2016/166252

SUMMARY OF INVENTION

Technical Problem

As discussed above, the above-described methods for controlling a building-inhabiting pest are not sufficient for controlling building-inhabiting pests, and there is room for improvement. For example, development of a method of controlling a building-inhabiting pest that has acquired resistance to existing chemicals, or development of a drug or method having a long-term residual effect, remains essentially unheard of Accordingly, an object of the present invention is to provide a method for controlling a building-inhabiting pest and a composition for controlling a building-inhabiting pest that have excellent durability and are also effective on a resistant building-inhabiting pest.

Solution to Problem

As a result of the intensive studies to solve the problem described above, the present inventors have found that an amide derivative represented by Formula (1) does not exhibit any repellent effect, is relatively stable to heat or the like, has a slow-acting effect, and is excellent in the residual effect.

Accordingly, the present inventors have found that by treating a space in a building with a composition for controlling a building-inhabiting pest containing an amide derivative represented by Formula (1), as an active component, building-inhabiting pests can be controlled over a long period of time, and further, a domino effect can also be expected. In addition, the present inventors have found that a composition for controlling a building-inhabiting pest containing an amide derivative represented by Formula (1), as an active component, is effective also to a resistant building-inhabiting pest, and thus have completed the present invention. That is, the present invention is as follows.

<1> A method for controlling a building-inhabiting pest, the method comprising:

treating a space in a building with a composition for controlling a building-inhabiting pest, the composition containing, as an active component, at least one kind of an amide derivative represented by the following Formula (1):

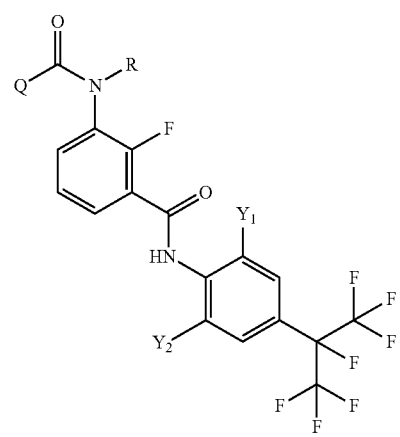

(1)

wherein, in Formula (1), Q represents an unsubstituted phenyl group or a phenyl group substituted at the 2-, 3- or 4-position with one fluorine atom, R represents a hydrogen atom or a methyl group, and each of $Y_1$ and $Y_2$ independently represents a bromine atom, an iodine atom, or a trifluoromethyl group.

<2> The method for controlling a building-inhabiting pest described in <1>, wherein, in Formula (1), $Y_1$ represents a trifluoromethyl group, and $Y_2$ represents a bromine atom or an iodine atom.

<3> The method for controlling a building-inhabiting pest described in <2>, wherein the amide derivative represented by Formula (1) is 2-fluoro-3-(N-methylbenzamide)-N-(2-bromo-6-trifluoromethyl-4-(heptafluoropropane-2-yl) phenyl)benzamide.

<4> The method for controlling a building-inhabiting pest described in any one of <1> to <3>, wherein the building-inhabiting pest to be controlled is at least one selected from the group consisting of smoky brown cockroach (*Periplaneta fuliginosa*), German cockroach (*Blattella germanica*), bed bug (*Cimex lectularius*), European house dust mite (*Dermatophagoides pteronyssinus*), and common grain mite (*Tyrophagus putrescentiae*).

<5> The method for controlling a building-inhabiting pest described in any one of <1> to <4>, wherein the composition for controlling a building-inhabiting pest is an aerosol agent of which a total amount is sprayed at one time, and spray treatment with the aerosol agent is performed on the space in the building.

<6> The method for controlling a building-inhabiting pest described in any one of <1> to <4>, wherein the composition for controlling a building-inhabiting pest is a smoking agent, and smoking treatment with the smoking agent is performed on the space in the building.

<7> A composition for controlling a building-inhabiting pest, the composition comprising, as an active component, at least one kind of an amide derivative represented by the following Formula (1):

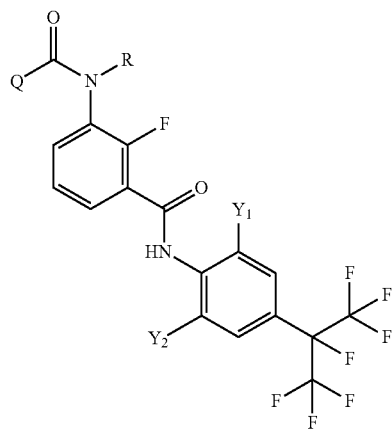

wherein, in Formula (1), Q represents an unsubstituted phenyl group or a phenyl group substituted at the 2-, 3- or 4-position with one fluorine atom, R represents a hydrogen atom or a methyl group, and each of $Y_1$ and $Y_2$ independently represents a bromine atom, an iodine atom, or a trifluoromethyl group.

<8> The composition for controlling a building-inhabiting pest described in <7>, wherein in Formula (1), $Y_1$ represents a trifluoromethyl group, and $Y_2$ represents a bromine atom or an iodine atom.

<9> The composition for controlling a building-inhabiting pest described in <8>, wherein the amide derivative represented by Formula (1) is 2-fluoro-3-(N-methylbenzamide)-N-(2-bromo-6-trifluoromethyl-4-(heptafluoropropane-2-yl) phenyl)benzamide.

<10> The composition for controlling a building-inhabiting pest described in any one of <7> to <9>, wherein the building-inhabiting pest to be controlled is at least one selected from the group consisting of smoky brown cockroach (*Periplaneta fuliginosa*), German cockroach (*Blattella germanica*), bed bug (*Cimex lectularius*), European house dust mite (*Dermatophagoides pteronyssinus*), and common grain mite (*Tyrophagus putrescentiae*).

<11> The composition for controlling a building-inhabiting pest described in any one of <7> to <10>, wherein the composition for controlling a building-inhabiting pest is an aerosol agent of which a total amount is sprayed at one time, or a smoking agent.

Advantageous Effects of Invention

According to the present invention, a method for controlling a building-inhabiting pest and a composition for controlling a building-inhabiting pest that have excellent insecticidal property and durability, and are also effective on a resistant building-inhabiting pest can be provided.

The composition and the control method according to the present invention do not allow pests to escape from a treatment area, and the insecticidal effect is sustained for a long period of time, as a result of which more complete building-inhabiting pest control can be achieved. Further, it can be expected that the frequency of treatment with the composition can be reduced rather than in the past.

In the composition and the control method according to the present invention, an effect (domino effect) that a pest that has come into contact with the composition brings the composition back to a nest of the pest, and the composition controls also other pests in the nest can be expected.

In addition, by using the composition according to the present invention as an aerosol agent of which a total amount is sprayed at one time or a smoking agent, the composition can reach everywhere in a building, as a result of which the effects of the present invention are more effectively exerted.

BRIEF DESCRIPTION OF DRAWINGS

FIG. 1 is a schematic diagram showing a test room and slit boxes used in Examples.

DESCRIPTION OF EMBODIMENTS

Hereinafter, the embodiment of the present invention will be described. The descriptions and examples are illustrative, and are not intended to limit the scope of the present invention.

In the present specification, the numerical range expressed by using "to" means a range including the numerical values described before and after the "to" as the lower limit value and the upper limit value, respectively.

In the case of referring to an amount of each of components in the composition in the present specification, when multiple kinds of substances corresponding to each of components are present in the composition, the total amount of the multiple kinds of substances present in the composition is meant unless otherwise specified.

The chemical structural formula in the present specification may be described as a simplified structural formula in which a hydrogen atom is omitted.

The composition for controlling a building-inhabiting pest (hereinafter also simply referred to as "composition") according to the present invention contains, as an active component, at least one kind of an amide derivative represented by the following Formula (1). With this constitution, by treating a space or the like in a building with the composition according to the present invention, the composition have excellent durability and are also effective on a resistant building-inhabiting pest, and can exert a high controlling effect on building-inhabiting pests.

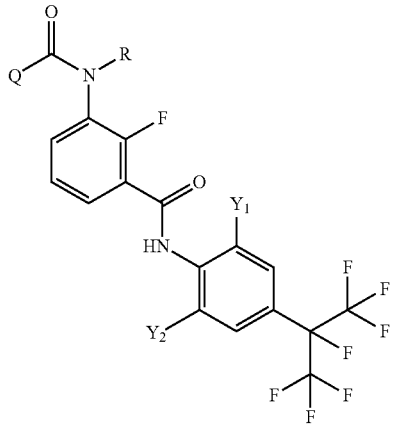

(1)

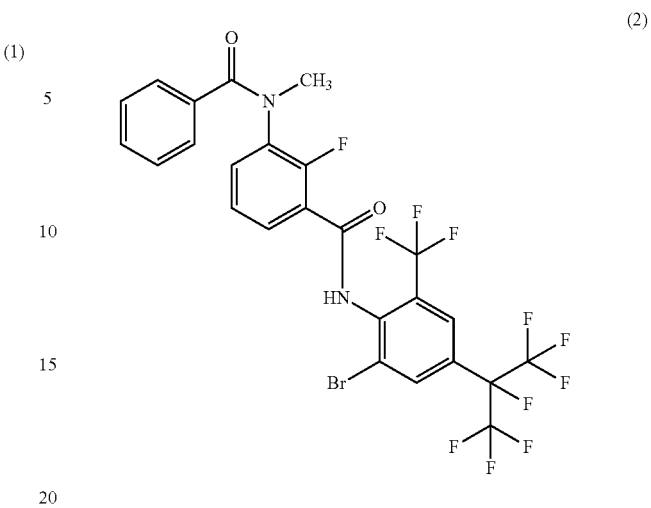

(2)

In Formula (1), Q represents an unsubstituted phenyl group or a phenyl group substituted at the 2-, 3- or 4-position with one fluorine atom. That is, examples of the phenyl group substituted with a fluorine atom include a 2-fluorophenyl group, a 3-fluorophenyl group, and a 4-fluorophenyl group.

As the substituent Q, an unsubstituted phenyl group, a 2-fluorophenyl group, a 3-fluorophenyl group, or a 4-fluorophenyl group is preferably mentioned.

In Formula (1), R represents a hydrogen atom or a methyl group.

In Formula (1), each of $Y_1$ and $Y_2$ independently represents a bromine atom, an iodine atom, or a trifluoromethyl group. Preferably, $Y_1$ represents a trifluoromethyl group, and $Y_2$ represents a bromine atom or an iodine atom.

Any combination of substituents Q, R, $Y_1$, and $Y_2$ is included in the range described in the present specification.

The amide derivative represented by Formula (1) to be used in the present invention contains one or multiple asymmetric carbon atoms or asymmetric centers in the structural formula in some cases, also contains two or more kinds of optical isomers in some cases, and includes all of the respective optical isomers and mixtures in which the optical isomers are contained in an arbitrary proportion. Further, the amide derivative represented by Formula (1) to be used in the invention also contains two or more kinds of geometric isomers derived from a carbon-carbon double bond in the structural formula in some cases, and includes all of the respective geometric isomers and mixtures in which the geometric isomers are contained in an arbitrary proportion.

The compound represented by Formula (1) is preferably 2-fluoro-3-(N-methylbenzamide)-N-(2-bromo-6-trifluoromethyl-4-(heptafluoropropane-2-yl) phenyl)benzamide represented by the following Formula (2).

The amide derivative represented by Formula (1) to be used in the present invention can be produced in accordance with, for example, a method described in the specification of WO 2010/013567 or the like.

The amide derivative represented by Formula (1) to be used in the present invention has a low repellent effect, and therefore, increases in frequency of contact with the treated composition without allowing the building-inhabiting pests to escape from the treatment area, and in combination with the slow-acting property, it is possible to bring the drug alive back to the inside of a bed, bedclothes, a place where a drug composition is difficult to reach, and a breeding place of pests, which are so-called pest nests, and as a result of which a domino effect can be exerted.

In the present invention, the expression "building" is referred to as a building where people mainly act, such as a restaurant, a store, an office, a factory, a hospital, an accommodation facility, in addition to a single-family dwelling, and a housing complex, and the expression "the inside of a building" is referred to as the entire interior of a building, or part of a room or the like, such as a room, stairs, a corridor, and the like of such a building.

Further, the expression "space in a building" is referred to as the entire or part of a space inside the above-described building, and includes an air in the building, a wall surface, a floor surface, and a ceiling surface, which constitute the inside of the building, and a space between the surfaces of the inside of the building and furniture such as a bureau, a sofa, or a bed, and further includes a space inside a wall, a space in the ceiling, and a space under the floor.

The expression "building-inhabiting pests" controlled by the method for controlling a building-inhabiting pest according to the present invention is referred to as an organism harmful to human life, and includes a pest called a house pest, a dwelling house pest, an indoor pest, or a household pest. As such a pest, specifically, for example, the following pests can be mentioned, but the building-inhabiting pests in the present invention is not limited thereto. As the representative building-inhabiting pests to be controlled by the present invention, cockroaches, lice, fleas, and mites can be mentioned.

As Blattodea, smoky brown cockroach (*Periplaneta fuliginosa*), Japanese cockroach (*Periplaneta japonica*), German cockroach (*Blattella germanica*), American cockroach (*Periplaneta Americana*) or the like can be mentioned;

as Hemiptera, bed bug (*Cimex lectularius*), tropical bed bug (*Cimex hemipterus*) or the like can be mentioned;

as Siphonaptera, cat flea (Ctenocephalidae *felis*), dog flea (*Ctenocephalides canis*), chicken flea (*Echidnophaga gallinacea*), human flea (*Pulex irritans*), oriental rat flea (*Xenopsylla cheopis*) or the like can be mentioned; and as Acari, house dust mites such as American house dust mite (*Dermatophagoides farinae*), or European house dust mite (*Dermatophagoides pteronyssinus*), acarid mites such as common grain mite (*Tyrophagus putrescentiae*), Kounohoshika mite (Lardoglyphus *konoi*), or wheat acarid mite (*Aleuroglyphus ovatus*), or the like can be mentioned.

Among the above ones, as a building-inhabiting pest particularly suitable for a control target of the present invention, smoky brown cockroach (*Periplaneta* fidiginosa), German cockroach (*Blattella germanica*), bed bug (*Cimex lectularius*), European house dust mite (*Dermatophagoides pteronyssinus*), or common grain mite (*Tyrophagus putrescentiae*) is mentioned.

Further, in the composition according to the present invention, in addition to the amide derivative represented by Formula (1), one or two or more kinds of other insecticidal components (pest control components) and/or a synergist, which are generally known, may be further contained. Examples of the other insecticidal components include Pyrethroid compounds such as dd-T-cyphenothrin, acrinathrin, permethrin, phenothrin, d-phenothrin, allethrin, d-allethrin, dd-allethrin, pyrethrin, prallethrin, cyphenothrin, cyfluthrin, beta-cyfluthrin, bifenthrin, cycloprothrin, cyhalothrin, lambda-cyhalothrin, gamma-cyhalothrin, cypermethrin, sigma-cypermethrin, alpha-cypermethrin, zeta-cypermethrin, dimefluthrin, empenthrin, deltamethrin, terallethrin, tefluthrin, fenvalerate, esfenvalerate, flucythrinate, flufenprox, flumethrin, fluvalinate, tau-fluvalinate, profluthrin, halfenprox, imiprothrin, benfluthrin, resmethrin, d-resmethrin, silafluofen, tralomethrin, tetramethrin, d-ttetramethrin, furamethrin, metofluthrin, fenpropathrin, transfluthrin, or etofenprox;

Organophosphorus compounds such as acephate, buta-thiofos, chlorethoxyfos, chlorfenvinphos, chlorpyrifos, chlorpyrifos-methyl, cyanophos, diazinon, bis(2-chloroisopropyl)ether (DCIP), dichlofenthion, dichlorvos, dimethoate, dimethylvinphos, disulfoton, o-ethyl-o-(4-nitrophenyl)phenylphosphonothioate (EPN), ethion, ethoprophos, etrimfos, fenthion, fenitrothion, fosthiazate, formothion, isofenphos, isoxathion, malathion, mesulfenfos, methidathion, monocrotophos, naled, parathion, phosalone, phosmet, pirimiphos-methyl, pyridaphenthion, quinalphos, phenthoate, profenofos, propaphos, prothiofos, pyraclofos, salithion, sulprofos, temefos, terbufos, trichlorfon, or cadusafos;

N-phenylpyrazole compounds such as fipronil;

Carbamate compounds such as propoxur, alanycarb, benfuracarb, Bassa (BPMC), carbaryl, carbofuran, carbosulfan, cloethocarb, ethiofencarb, fenobucarb, methomyl, methiocarb, Carbaryl (NAC), oxamyl, pirimicarb, 3,5-xylyl methylcarbamate (XMC), thiodicarb, xylycarb, or aldicarb;

Oxadiazole compound such as metoxadiazone;

Neonicotinoid compound such as imidacloprid, clothianidin, thiamethoxam, dinotefuran, acetamiprid, nitenpyram, or thiacloprid;

Insect growth regulators such as pyriproxyfen, methoprene, hydroplane, fenoxycarb, etoxazole, chlorfluazuron, triazuron, novaluron, hexaflumuron, diflubenzuron, cyromazine, flufenoxuron, teflubenzuron, triflumuron, or lufenuron;

Macrolide compounds such as milbemycin, abamectin, or ivermectin; and

Diamide compounds such as chlorantraniliprole, cyantraniliprole, cyclaniliprole, tetraniliprole, flubendiamide, or cyhalodiamide.

As the synergist, for example, compounds such as piperonyl butoxide, O-propargyl-O-propyl phenylphosphonate (NIA16388), isobornyl thiocyanoacetate (IBTA), N-(2-ethylhexyl)-bicyclo[2.2.1]-hept-5-ene-2,3-dicarboximide (MGK-264), 2,2',3,3,3,3',3',3'-octachlorodipropylether (S-421), SYNEPIRIN 500, propyl isome, piperonyl cyclonene, sesamolin, sesamex, sesamin, sulfoxide, safroxan, or benzyl benzoate can be mentioned.

The amide derivative represented by Formula (1) is favorably mixed in the composition according to the present invention so as to be preferably from 0.01 to 50% by mass, and more preferably from 0.05 to 20% by mass.

Further, as a mixing ratio of the amide derivative represented by Formula (1) and the other insecticidal components in the composition according to the present invention is preferably, the amide derivative represented by Formula (1): other insecticidal components=1:from 0.05 to 20, in terms of mass ratio.

The composition according to the present invention can be used as various preparations. For example, an aerosol agent, a spray agent, an aerosol agent of which a total amount is sprayed at one time, a heat transpiration agent, a smoking agent, a liquid, a dustable powder, and the like can be mentioned. In order to make these preparations, for example, the various preparations can be obtained by mixture, stirring, granulation, tableting or the like by using water; alcohols such as ethanol, or propanol; ester; ether; hydrocarbon-based solvents such as kerosene; surfactants such as polyoxyethylene (POE) alkyl ether, POE hydrogenated castor oil, an alkyl sulfate, or a quaternary ammonium salt; propellants such as liquefied petroleum gas, dimethyl ether, or alternative freon; inorganic compounds such as talc, silica, or kaolin; binding agents such as starch, or carboxymethyl; or the like. Further, if necessary, by treating the inside of a building with the composition according to the invention with the use of a hand spray container equipped with a spraying device, an aerosol can, a heat transpiration device with an electric heater or an exothermic agent, or the like, the pests inhabiting the building can be controlled.

The treatment with the composition according to the present invention to a space in a building is achieved by treating the space with the composition by a method suitable for the form of the composition, or a method commonly used for each preparation.

The amount of the composition according to the present invention for treatment can be appropriately changed according to the kind or the generated number of building-inhabiting pests, the form of the composition, or the kind or mixing amount of an auxiliary agent, and is preferably from 5 to 100 mg, and more preferably from 10 to 50 mg per volume ($m^3$) in a building in terms of the amount of the amide derivative represented by Formula (1).

EXAMPLES

Example 1

<Aerosol Agent of which a Total Amount is Sprayed at One Time>

Into a container, 30 ml of anhydrous ethanol containing 1.67 w/v % of a compound of Formula (2), and 70 ml of dimethyl ether were filled to obtain an aerosol agent of which a total amount is sprayed at one time.

Example 2

<Aerosol Agent of which a Total Amount is Sprayed at One Time>

Into a container, 30 ml of anhydrous ethanol containing 3.33 w/v % of a compound of Formula (2), and 70 ml of dimethyl ether were filled to obtain a once-spray type aerosol agent.

Example 3

<Hydrolytic Heating Type Smoking Agent>

A composition containing 5 w/w % of a compound of Formula (2), 2 w/w % of starch, and 93 w/w % of azodicarbonamide was granulated to obtain granules. Into a container, 10 g of the granules, and 65 g of calcium oxide were filled to obtain a hydrolytic heating type smoking agent.

Example 4

<Hydrolytic Heating Type Smoking Agent>

A composition containing 10 w/w % of a compound of Formula (2), 2 w/w % of starch, and 88 w/w % of azodicarbonamide was granulated to obtain granules. Into a container, 10 g of the granules, and 65 g of calcium oxide were filled to obtain a hydrolytic heating type smoking agent.

Hereinafter, the usefulness of the method for controlling a building-inhabiting pest according to the present invention will be specifically described in the following Test Examples, however, the present invention is not limited only to the Test Examples.

<Test Example 1> Drug Efficacy Test for Resistant Building-Inhabiting Pest

Test drug: a compound represented by Formula (2)

Test insect: Watarida colony (susceptible strain) of German cockroach (*Blattella germanica*); Hamamatsu-cho colony (resistant strain) of German cockroach (*Blattella germanica*); Teikyo University colony (susceptible strain) of bed bug (*Cimex lectularius*); and Chiba colony (resistant strain) of bed bug (*Cimex lectularius*), Insecticidal test: An acetone solution of a compound represented by Formula (2) was applied to the chest of a target insect female adult by using a topical application device. The mortality was examined six days later for the German cockroach and three days later for the bed bug, and each 50% lethal dose was determined. Further, the resistance ratio was calculated by the following equation.

Resistance ratio=50% lethal dose of resistant strain/ 50% lethal dose of susceptible strain The results are shown in Table 1.

TABLE 1

| Test insect | Strain | 50% lethal dose (ng/insect) | Resistance ratio |
|---|---|---|---|
| German cockroach | Watarida colony | 11.2 | 1.9 |
| | Hamamatsu-cho colony | 21.5 | |
| Bed bug | Teikyo University colony | 1.3 | 11.4 |
| | Chiba colony | 14.8 | |

The resistance ratio of etofenprox to bed bugs was 10000 or more, and therefore, the superiority of the composition according to the present invention was indicated.

<Test Example 2> Direct Exposure Test for Various Building-Inhabiting Pests

Sample: the aerosol agent of Example 1, of which a total amount is sprayed at one time, the hydrolytic heating type smoking agent of Example 3, and the hydrolytic heating type smoking agent of Example 4

Test insect: smoky brown cockroach (*Periplaneta fuliginosa*); Hyogo colony (resistant strain) of German cockroach (*Blattella germanica*); Chiba colony (resistant strain) of bed bug (*Cimex lectularius*); European house dust mite (*Dermatophagoides pteronyssinus*); and common grain mite (*Tyrophagus putrescentiae*)

Test method: At a ventilation rate of 32 m$^3$ (once)/h in a 13-m$^2$ test room, 10 cockroaches and from 5 to 10 bed bugs were tested outside a slit box and inside the slit box in the test room arranged as shown in FIG. 1, and the test insects were treated with a sample for two hours in the center of the test room, and then collected in a clean plastic cup. The collection of test insects was performed by collecting the test insects from each of the test places. That is, test insects (open) that had tested outside the slit box, and test insects (in the slit) that had tested inside the slit box and stayed there, which were collected separately, and examination of life or death was performed on the separately collected test insects 24 hours later and 48 hours later, respectively, and the fatality rate was calculated. Approximately from 100 to 500 insects of each of European house dust mite and common grain mite were tested outside a slit box, and treatment with a sample was performed in the center of the test room. After 2 hours, the test insects were collected from the test room, and placed in a tray adjusted to 75% RH, examination of life or death was performed on the collected test insects 24 hours later and 48 hours later, respectively, and the fatality rate was calculated.

The results are shown in Table 2.

TABLE 2

| | | Fatality rate (%) | | | |
|---|---|---|---|---|---|
| | | Open | | In the slit | |
| Test insect | Sample | 24 h | 48 h | 24 h | 48 h |
| Smoky brown cockroach | Example 1 | 18 | 98 | 0 | 20 |
| | Example 3 | 8 | 73 | 0 | 5 |
| | Example 4 | 30 | 98 | 0 | 43 |
| Resistant German cockroach | Example 1 | 100 | 100 | 63 | 100 |
| | Example 3 | 100 | 100 | 78 | 100 |
| | Example 4 | 100 | 100 | 100 | 100 |
| Resistant bed bug | Example 3 | 18 | 58 | 5 | 30 |
| | Example 4 | 85 | 98 | 48 | 83 |
| European house dust mite | Example 4 | 98 | 97 | — | — |
| Common grain mite | Example 4 | 99 | 99 | — | — |

The composition according to the present invention showed a high controlling effect on building-inhabiting pests, particularly building-inhabiting pests having resistance. Further, as compared with a case in which a similar test was performed by using an active component other than the amide derivative according to the present invention, an excellent controlling effect was shown in the case of using the composition according to the present invention.

<Test Example 3> Residual Effect Test for Various Building-Inhabiting Pests Sample: the aerosol agent of Example 2, of which a total amount is sprayed at one time, and the hydrolytic heating type smoking agent of Example 4

Test insect: smoky brown cockroach (*Periplaneta fuliginosa*); Hyogo colony (resistant strain) of German cockroach (*Blattella germanica*); and Chiba colony (resistant strain) of bed bug (*Cimex lectularius*)

Test method: At a ventilation rate of 32 m$^3$ (once)/h in a 13 m$^2$ test room, a plastic cup with filter paper attached to the bottom of the plastic cup and a decorative laminated board were arranged in the test room, and treatment with a sample was performed in the center of the test room. After 2 hours, the treated plastic cup and decorative laminated board were collected, and left to stand at 25° C. in a test room and stored. After two weeks, and after four weeks, 10 bed bugs were tested in the treated plastic cup, and from 9 to 10 cockroaches were tested on the treated decorative laminated board, examination of life or death was performed on the tested bed bugs and cockroaches 24 hours later and 48 hours later, respectively, and the fatality rate was calculated.

The results are shown in Table 3.

TABLE 3

| | | Fatality rate (%) | | | |
|---|---|---|---|---|---|
| | | After two weeks | | After four weeks | |
| Test insect | Sample | 24 h | 48 h | 24 h | 48 h |
| Smoky brown cockroach | Example 2 | 100 | 100 | 100 | 100 |
| | Example 4 | 4 | 74 | 4 | 78 |
| Resistant German cockroach | Example 2 | 100 | 100 | 100 | 100 |
| | Example 4 | 100 | 100 | 100 | 100 |
| Resistant bed bug | Example 2 | 55 | 85 | 50 | 80 |
| | Example 4 | 40 | 95 | 70 | 100 |

The composition according to the present invention showed an excellent residual effect on building-inhabiting pests, particularly building-inhabiting pests having resistance. Further, as compared with a case in which a similar test was performed by using an active component other than the amide derivative according to the present invention, an excellent effect was shown in the case of using the composition according to the present invention.

Further, it was found that although the composition according to the present invention exerted an excellent insecticidal effect as a result, the effect was moderately exerted, and an insecticidal action was slightly slowly exhibited.

<Test Example 4> Heat Volatilization Test

Sample: a compound represented by Formula (2)

Test insect: Watarida colony (susceptible strain) of German cockroach (*Blattella germanica*)

Test method: At a ventilation rate of 32 m$^3$ (once)/h in a 13-m$^2$ test room, 10 cockroaches were tested outside a slit box and inside the slit box in the test room arranged as shown in FIG. 1, and 1 g of sample was heated at 300° C. After 15 hours, examination of life or death was performed on the tested cockroaches, and the fatality rate was calculated.

As a result of the test, it was found that the fatality rates of German cockroaches both outside the slit box and inside the slit box were 100%, and the effective amount was volatilized.

It was shown that the amide derivative represented by Formula (1) is difficult to be decomposed by heat, and an excellent fatality rate was shown to the German cockroach by volatilization.

<Test Example 5> Repellency Test

Sample: a compound represented by Formula (2), and etofenprox (control agent)

Test insect: Denken colony (susceptible strain) of German cockroach (*Blattella germanica*)

Test method: A test compound diluted with acetone was treated and dried on a glass disc having a diameter of 12 cm so as to be 0.3 μg/cm$^2$. A pet cup having 6 cm in inner diameter×0.5 cm in height was cut so as to have an entrance, and the pet cup was turned over and placed on the glass disc to make a shelter. A non-treated shelter and a drug-treated shelter were placed in the center of an acrylic box having 30 cm×15 cm, well water and rat feed were added as food, and 15 males and 15 females of German cockroach were released. After 7 days, the number of surviving insects, the number of dead insects, the number of agonizing insects, and the habitat were examined. Further, a KD (knockdown) rate and a repellency rate were calculated by the following equations.

KD rate (%)=(the number of dead insects+the number of agonizing insects)/the number of released insects×100

Repellency rate (%)=(1−the number of cockroaches in treated area/(the number of cockroaches in treated area+the number of cockroaches in non-treated area)×100

The results are shown in Table 4.

TABLE 4

| | | Treated shelter | | | Non-treated shelter | | | Outside the area | | | KD rate % | Repellency rate % |
|---|---|---|---|---|---|---|---|---|---|---|---|---|
| | | Number of surviving insects | Number of agonizing insects | Number of dead insects | Number of surviving insects | Number of agonizing insects | Number of dead insects | Number of surviving insects | Number of agonizing insects | Number of dead insects | | |
| Compound represented by Formula (2) | female | 0 | 0 | 0 | 0 | 0 | 0 | 0 | 2 | 13 | 100 | — |
| | male | 0 | 0 | 0 | 0 | 0 | 0 | 0 | 1 | 14 | 100 | — |
| | Total | 0 | 0 | 0 | 0 | 0 | 0 | 0 | 3 | 27 | 100 | — |

TABLE 4-continued

| | | Treated shelter | | | Non-treated shelter | | | Outside the area | | | Repellency rate % |
|---|---|---|---|---|---|---|---|---|---|---|---|---|
| | | Number of surviving insects | Number of agonizing insects | Number of dead insects | Number of surviving insects | Number of agonizing insects | Number of dead insects | Number of surviving insects | Number of agonizing insects | Number of dead insects | KD rate % | |
| Etofenprox | female | 0 | 0 | 0 | 15 | 0 | 0 | 0 | 0 | 0 | 0 | 100 |
| | male | 0 | 0 | 0 | 14 | 0 | 0 | 0 | 0 | 1 | 7 | 100 |
| | Total | 0 | 0 | 0 | 29 | 0 | 0 | 0 | 0 | 1 | 3 | 100 |
| Non-treated | female | 5 | 0 | 0 | 7 | 0 | 0 | 2 | 0 | 1 | 7 | 58 |
| | male | 6 | 0 | 0 | 7 | 0 | 0 | 1 | 0 | 1 | 7 | 54 |
| | Total | 11 | 0 | 0 | 14 | 0 | 0 | 3 | 0 | 2 | 7 | 56 |

The Denken German cockroach had 100% knockdown within 48 hours when forcibly brought into contact with a glass disc that had been treated with the compound of Formula (2) and etofenprox so as to have a concentration of 0.3 μg/cm$^2$. In the present test, even after 7 days, surviving insects were observed for the etofenprox being a control agent, and therefore, it was indicated that the etofenprox has a repellent effect. On the other hand, 100% knockdown was observed for the compound represented by Formula (2), and therefore, it was indicated that the compound has no repellent effect.

<Test Example 6> Domino Effect Test

Sample: a hydrolytic heating type smoking agent of Example 4

Test insect: Teikyo University colony (susceptible strain) of bed bug (*Cimex lectularius*)

Test method: At a ventilation rate of 32 m$^3$ (once)/h in a 13-m$^2$ test room, a Petri dish with high height was arranged in the test room, and treated with a sample in the center of the test room. After 2 hours, the treated Petri dish with high height was collected, and one bed bug was released to acclimate for 4 hours. After that, the acclimated bed bug was released in a non-treated Petri dish with high height in which 5 bed bugs had been provided. After 72 hours, the life or death of the bed bugs that had not been in contact with the drug-treated Petri dish with high height was examined, and the fatality rate was calculated. The test was repeated three times. As a result, the fatality rate was 66.7%.

It was confirmed that the composition according to the present invention has a domino effect.

<Test Example 7> Field Efficacy Test

Sample: a hydrolytic heating type smoking agent of Example 4

Target pest: German cockroach (*Blattella germanica*)

Implementation place: a restaurant

Area: 16.57 m$^2$ of kitchen, 77.57 m$^2$ of others, and 94.14 m$^2$ in total

The number of samples for treatment: eight cans

Test method: a cockroach index calculated by the following equation was examined before treatment. Eight samples were placed in 8 locations in a restaurant, respectively, and subjected to smoking treatment, and then the samples were kept in a closed state for 11 hours without ventilation, the cockroach index was examined continuously from the day after the treatment, and the residual effect was confirmed.

Cockroach index=the number of captured cockroaches by trapping/(days of traps arranged×the number of traps arranged)

The results are shown in Table 5.

TABLE 5

| | Test day | | | | | | | | | | |
|---|---|---|---|---|---|---|---|---|---|---|---|
| | Before treatment | The day after treatment | Three Days after | One week after | Two week after | Three week after | Four week after | Five week after | Nine week after | 33 Week after | 55 Week after |
| Cockroach index | 19.38 | 2.85 | 0.45 | 0.10 | 0.07 | 0.00 | 0.00 | 0.00 | 0.00 | 0.00 | 0.00 |

With the pest control method and the pest control composition according to the present invention, an excellent long-term residual effect was exerted. Further, it was indicated that the composition according to the present invention was more effective for the exertion of the effect when used as a smoking agent.

The entire disclosure of Japanese Patent Application No. 2017-072196 filed on Mar. 31, 2017 is incorporated herein by reference.

All of references, patent applications, and technical standards that are described herein are incorporated herein by reference to the same extent as if such individual references, patent applications, and technical standards are specifically and individually indicated to be incorporated by reference.

INDUSTRIAL APPLICABILITY

The composition according to the present invention has a residual effect, and further is effective also to a resistant building-inhabiting pest, and therefore, the composition has high industrial applicability.

REFERENCE SIGNS LIST

1 Test room
2 Slit box
3 Slit
4 Sample

The invention claimed is:

1. A method for controlling an etofenprox-resistant building-inhabiting pest, the method comprising:
    treating a space in a building with a composition for controlling an etofenprox-resistant building-inhabiting pest, the composition containing, as an active component, at least an amide derivative represented by the following Formula (1), in a form of an aerosol agent of which a total amount is sprayed at one time or a smoking agent, in an amount of from 5 to 100 mg per volume ($m^3$) in the building in terms of an amount of the amide derivative represented by the following Formula (1):

wherein, in Formula (1), Q represents an unsubstituted phenyl group or a phenyl group substituted at the 2-, 3- or 4-position with one fluorine atom, R represents a hydrogen atom or a methyl group, and each of $Y_1$ and Y2 independently represents a bromine atom, an iodine atom, or a trifluoromethyl group.

2. The method for controlling an etofenprox-resistant building-inhabiting pest according to claim 1, wherein, in Formula (1), $Y_1$ represents a trifluoromethyl group, and $Y_2$ represents a bromine atom or an iodine atom.

3. The method for controlling an etofenprox-resistant building-inhabiting pest according to claim 2, wherein the amide derivative represented by Formula (1) is 2-fluoro-3-(N-methylbenzamide)-N-(2-bromo-6-trifluoromethyl-4-(heptafluoropropane-2-yl)phenyl)benzamide.

4. The method for controlling an etofenprox-resistant building-inhabiting pest according to claim 1, wherein the etofenprox-resistant building-inhabiting pest to be controlled is at least one selected from the group consisting of smoky brown cockroach, German cockroach, bed bug, European house dust mite, and common grain mite.

5. The method for controlling an etofenprox-resistant building-inhabiting pest according to claim 1, wherein the composition for controlling an etofenprox-resistant building-inhabiting pest is the aerosol agent of which a total amount is sprayed at one time, and spray treatment with the aerosol agent is performed on the space in the building.

6. The method for controlling an etofenprox-resistant building-inhabiting pest according to claim 1, wherein the composition for controlling an etofenprox-resistant building-inhabiting pest is the smoking agent, and smoking treatment with the smoking agent is performed on the space in the building.

7. A composition for controlling an etofenprox-resistant building-inhabiting pest, the composition comprising, as an active component, at least an amide derivative represented by the following Formula (1):

wherein, in Formula (1), Q represents an unsubstituted phenyl group or a phenyl group substituted at the 2-, 3- or 4-position with one fluorine atom, R represents a hydrogen atom or a methyl group, and each of $Y_1$ and $Y_2$ independently represents a bromine atom, an iodine atom, or a trifluoromethyl group, wherein a treatment amount of the composition is from 5 to 100 mg per volume ($m^3$) in a space of a building in terms of an amount of the amide derivative represented by Formula (1), wherein the composition for controlling an etofenprox-resistant building-inhabiting pest is an aerosol agent of which a total amount is sprayed at one time, or a smoking agent, and wherein the etofenprox-resistant building-inhabiting pest to be controlled is at least one selected from the group consisting of smoky brown cockroach, German cockroach, bed bug, European house dust mite, and common grain mite.

8. The composition for controlling an etofenprox-resistant building-inhabiting pest according to claim 7, wherein in Formula (1), $Y_1$ represents a trifluoromethyl group, and $Y_2$ represents a bromine atom or an iodine atom.

9. The composition for controlling an etofenprox-resistant building-inhabiting pest according to claim 8, wherein the amide derivative represented by Formula (1) is 2-fluoro-3-(N-methylbenzamide)-N-(2-bromo-6-trifluoromethyl-4-(heptafluoropropane-2-yl)phenyl)benzamide.

10. The method for controlling an etofenprox-resistant building-inhabiting pest according to claim 1, wherein the treating the space in the building with the composition for controlling an etofenprox-resistant building-inhabiting pest comprises heating the composition for controlling an etofenprox-resistant building-inhabiting pest.

11. The method for controlling an etofenprox-resistant building-inhabiting pest according to claim 1, wherein the space in the building treated with the composition includes the etofenprox-resistant building-inhabiting pest.

12. The method for controlling an etofenprox-resistant building-inhabiting pest according to claim 1, the method further comprising contacting the etofenprox-resistant building-inhabiting pest with the composition in the space in the building.

13. The method for controlling an etofenprox-resistant building-inhabiting pest according to claim 1, the method further comprising:
    contacting the etofenprox-resistant building-inhabiting pest with the composition in the space in the building; and
    bringing the composition contacted with the etofenprox-resistant building-inhabiting pest to a nest of the etofenprox-resistant building-inhabiting pest to control other etofenprox-resistant building-inhabiting pest in the nest.

* * * * *